UNITED STATES PATENT OFFICE.

MAX PHILLIPS, OF EVANSVILLE, WISCONSIN.

SYNTHETIC MANUFACTURE OF THYMOL.

1,332,680.     Specification of Letters Patent.     Patented Mar. 2, 1920.

No Drawing.     Application filed September 8, 1919. Serial No. 322,585.

(FILED UNDER THE ACT OF MARCH 3, 1883, 22 STAT. L., 625.)

*To all whom it may concern:*

Be it known that I, MAX PHILLIPS, a citizen of the United States, and an employee of the Department of Agriculture, residing in the city of Evansville, county of Rock, State of Wisconsin, (whose post-office address is Department of Agriculture, Washington, D. C.,) have invented certain new and useful Improvements in Synthetic Manufacture of Thymol, of which the following is a specification.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

The present invention relates to the production of thymol from para-cymene, 1-methyl-4-isopropyl-benzene.

The process of converting para cymene into thymol is preferably carried out as follows: The first step consists in converting cymene into cymidin by any known procedure. An example of a good method being: Pure para-cymene is slowly added to an equal weight of sulfuric acid (sp. gr. 184) which is kept at or below 0° C. To this is slowly added the previously cooled nitrating mixture, consisting of 1 part nitric acid (sp. gr. 1.42) and 2 parts sulfuric acid (sp. gr. 1.84), the amount of nitric acid used being about 5 to 10 per cent. in excess of that necessary to substitute one nitro group into the cymene molecule. During the nitration the mixture is stirred efficiently and the temperature kept at or below 0° C. When all of the nitrating mixture has been added, the mixture is stirred for one hour longer. The mixture is then poured into cold water and the oily upper layer separated off. This is washed several times with water, with sodium carbonate solution and again with water. The nitro-cymene thus obtained is then reduced to amino cymene or cymidin, by means of iron and hydrochloric acid, in exactly the same way as that used in the industrial preparation of anilin from nitrobenzene.

The cymidin is now sulfonated, 100 parts by weight of cymidin are then slowly added to 69 parts by weight of sulfuric acid (sp. gr. 1.84) contained in a shallow dish and the solid crystalline mass of cymidin sulfate thus obtained is then converted into cymidin sulfonic acid by an identical method as that used in the so called "baking process" [*Zeitsch. angew, Chem.* 9, p. 685 (1896)] [*Ber.* 13, p. 1940, (1880)] [*Dingl. Polyt. J.* 264, p. 181 (1887)] for the preparation of sulfanilic acid from anilin sulfate.

This produces 1-methyl -2 amino -4-isopropyl -3 or 5 sulfonic acid. The cymidin sulfonic acid is then diazotized in the usual manner by treating with sodium nitrite in acid solution and the diazo body reduced with alkaline tin chlorid solution, or with formic acid and powdered copper, or with other relatively gentle reducing agents. The 3 or 5 cymidin sulfonic acid gives by the above process one and the same cymene sulfonic acid, namely 1-methyl-3-sulfonic-4-isopropyl benzene.

The sodium salt of the cymene sulfonic acid is then fused with sodium hydroxid in the usual manner and the hydroxyl group substituted for the sulfonic group. This gives 1-methyl-3-hydroxy-4-isopropyl-benzene, or thymol.

The thymol can be separated by dissolving the product obtained by the sodium hydroxid fusion, in water, acidulating with dilute sulfuric acid and then steam distilling, or it may be extracted with a suitable solvent or in any other appropriate manner.

The reactions which take place in the process are conveniently expressed as follows:

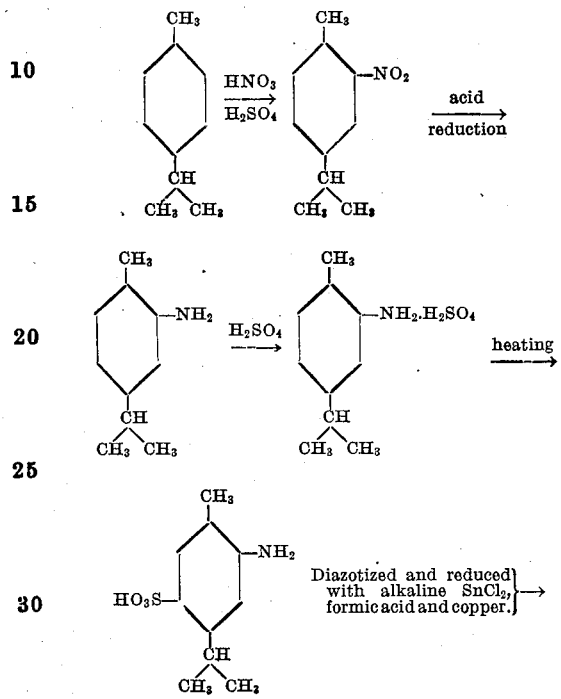

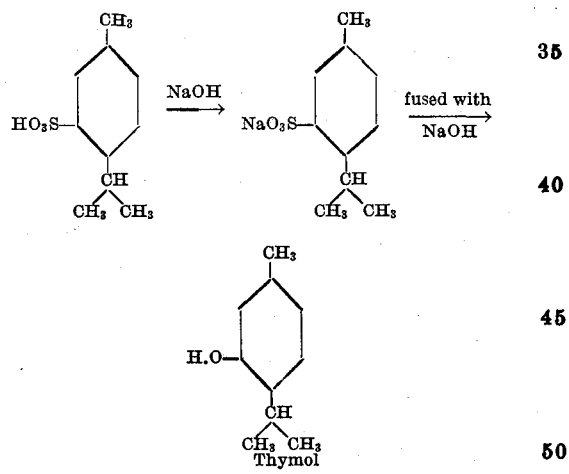

Having now fully described my invention, what I claim and desire to protect by Letters Patent is—

A process of making thymol which comprises treating paracymene with a nitrating mixture; reducing the nitro compound to cymidin; sulfonating the cymidin; eliminating the amino group residue; fusing the sulfonic compound with sodium hydroxid.

In testimony whereof I affix my signature in the presence of two subscribing witnesses.

MAX PHILLIPS.

Witnesses:
 LOUIS WEISBERG,
 L. A. SKINNER.